US 6,672,259 B2

(12) United States Patent
Blomberg

(10) Patent No.: US 6,672,259 B2
(45) Date of Patent: Jan. 6, 2004

(54) METHOD FOR POSITIONING SUPERHEATERS IN BIOMASS BURNING STEAM GENERATORS, AND STEAM GENERATOR

(76) Inventor: Tom Blomberg, Kiertomäentie 11 As. 1, FIN-01260 Vantaa (FI)

( * ) Notice: Subject to any disclaimer, the term of this patent is extended or adjusted under 35 U.S.C. 154(b) by 0 days.

(21) Appl. No.: 10/417,934

(22) Filed: Apr. 17, 2003

(65) Prior Publication Data

US 2003/0200938 A1 Oct. 30, 2003

(30) Foreign Application Priority Data

Apr. 24, 2002 (FI) .............................................. 20020787

(51) Int. Cl.[7] .................................................. F22G 3/00
(52) U.S. Cl. ..................... 122/460; 122/466; 122/467; 122/468; 122/476; 122/477; 122/478; 122/7 R
(58) Field of Search ................................ 122/4 D, 7 R, 122/460, 466, 467, 468, 477, 478, 476; 110/245, 347

(56) References Cited

U.S. PATENT DOCUMENTS

| 3,187,725 | A | | 6/1965 | Stange et al. | |
|---|---|---|---|---|---|
| 4,699,068 | A | * | 10/1987 | Engstrom | .................. 110/216 |
| 4,951,612 | A | * | 8/1990 | Gorzegno | ................. 122/4 D |
| 5,103,773 | A | * | 4/1992 | Andersson et al. | ......... 122/4 D |
| 5,325,796 | A | * | 7/1994 | Garcia-Mallol | ............. 110/245 |
| 5,460,127 | A | | 10/1995 | Nordenberg et al. | |
| 5,775,266 | A | * | 7/1998 | Ziegler | ....................... 122/7 R |
| 5,809,940 | A | * | 9/1998 | James et al. | ................. 122/4 D |
| 5,911,956 | A | * | 6/1999 | Viel Lamare et al. | ...... 422/177 |
| 6,021,743 | A | | 2/2000 | Bauer | |
| 6,058,858 | A | * | 5/2000 | Belin et al. | .................. 110/245 |
| 6,178,924 | B1 | * | 1/2001 | Hakulinen et al. | .......... 122/7 R |
| 6,269,778 | B1 | * | 8/2001 | Anderson et al. | ............ 122/4 D |

* cited by examiner

Primary Examiner—Jiping Lu
(74) Attorney, Agent, or Firm—Klauber & Jackson

(57) ABSTRACT

A method for positioning superheaters (2, 3, 4, 5) in biomass burning steam generators, and a steam generator. The steam generator comprises a combustion chamber (1), a flue gas duct (6), a steam circuit (7), and the superheaters (2, 3, 4, 5) positioned for minimizing corrosion at a high temperature. The steam generator is fitted with at least two superheaters (2, 3, 4, 5), whose positioning in the flue gas duct (6) and serial arrangement in the steam circuit (7) are effected in such a way that the superheater's or superheaters' heat transfer surface has its surface temperature remaining below the melting point of KOH, 406° C. (corresponds to a steam temperature of about 350–380° C.) down to the point in the flue gas duct (6), at which the flue gases' temperature has fallen to 750° C. While the flue gases are within the range of less than 750° C., the final superheating is effected to a higher temperature without significantly increasing the contamination and corrosion hazard for superheater surfaces.

4 Claims, 1 Drawing Sheet

METHOD FOR POSITIONING SUPERHEATERS IN BIOMASS BURNING STEAM GENERATORS, AND STEAM GENERATOR

BACKGROUND OF THE INVENTION

This invention relates to a method for positioning superheaters in biomass burning steam generators for minimizing the corrosion of superheater surfaces at a high temperature.

This invention relates also to a steam generator using biomass as a fuel, comprising a combustion chamber, a flue gas duct, a steam circuit, and superheaters positioned for minimizing corrosion at a high temperature.

The use of fossil fuels in energy production will be increasingly replaced in the future by the use of renewable natural resources. The use of various biomasses, such as wood, straw, willow, black liquor, etc., as a source of energy would reduce $CO_2$ discharges as compared to fossil fuels. However, in the process of using more and more biomasses as a fuel, it has been discovered that the heat transfer surfaces of steam generators contaminate and corrode prematurely in response to hot flue gases with biomass as a fuel. It has been contemplated that alkali metal sulphates, and especially alkali metal chlorides, constitute a cause for the accelerated contamination and corrosion rate of heat transfer surfaces. It has been contemplated that alkali, sulphur, and chloride, present in a fuel, discharges from the fuel in at least partially gaseous alkali sulphate and chloride in the combustion chamber of an incineration plant and condensates then on colder heat transfer surfaces in a superheater region, resulting in excessive contamination and corrosion.

It is prior known that the power generation efficiency of a power plant generator is the higher the higher the pressure, and thus temperature, applied to water vapour fed into a steam turbine. Hence, it is preferred that steam be superheated to become as hot as possible, yet without risking the endurance of a power plant. All-coal fired generator plants reach a steam temperature of more than 550° C. without notable corrosion hazards in a superheater region. In the process of burning biomasses, major corrosion has been discovered at superheating temperatures as low as less than 500° C.

Mixed burning has been found to have a positive effect on the endurance of a steam generator in the process of burning biomasses. The burning of 30% or more of e.g. peat along with biomass has resulted in a remarkable mitigation of the corrosion and contamination problem. This has been explained by the fact that KCl, splitting from biomass and present in a gas phase, reacts with $SO_2$ contained in flue gases to form $K_2SO_4$ which, by virtue of its higher melting point, does not form a molten phase on superheater surfaces and, consequently, does not smudge or corrode the superheater surfaces as much as KCl.

Since mixed burning increases carbon dioxide emissions and since even partial use of fossil fuels is not advisable in view of $CO_2$ discharges, the use of peat is disallowed e.g. in Sweden even for reasons relating to incineration technology. It is obvious that increasingly stringent environmental regulations and public disapproval shall make the use of peat and coal in mixed burning more difficult in other countries, as well.

SUMMARY OF THE INVENTION

This invention enables the achievement of high steam values (high temperature and pressure) in all-biomass burning facilities without increasing the corrosion and fouling hazard for the superheater surfaces of a steam generator.

In order to accomplish this, a steam generator and a method of the invention are characterized by what is defined in claims 1 and 3. Preferred embodiments of the invention are set forth in the dependent claims 2 and 4. Background of the present invention will be discussed next and the invention itself will be described later with reference to the accompanying FIG. 1.

DETAILED DESCRIPTION

Figure 1:
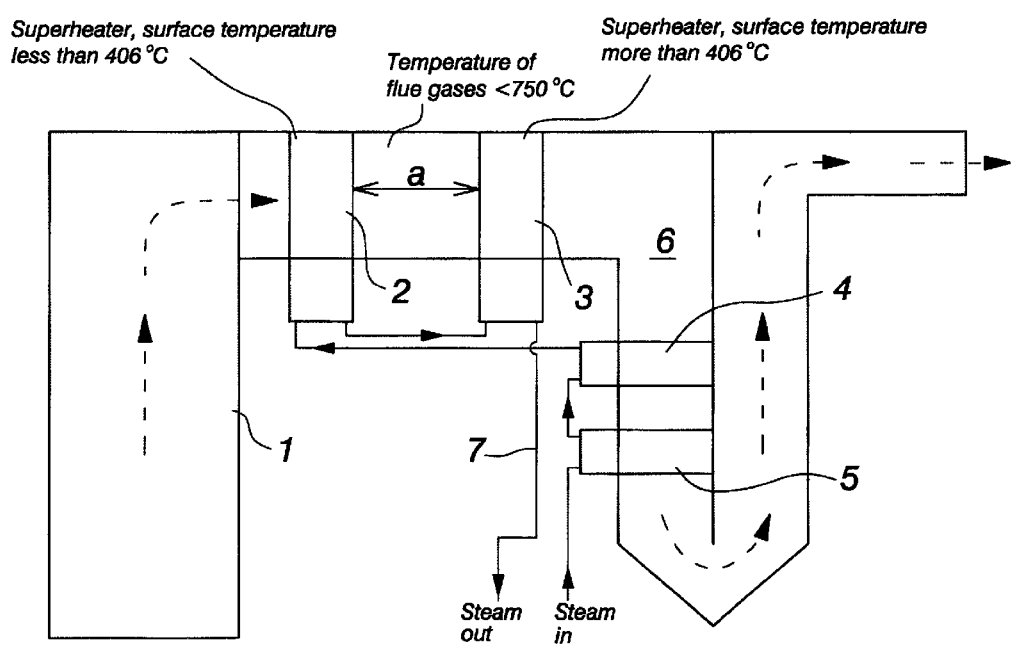
FIG. 1 is a schematic diagram illustrating the system and method of the present invention.

So-called biomasses and fossil fuels are different from one another in terms of the ratio of alkali metal contents to Cl- and S-contents. In biomasses, the ratios are generally higher than in fossil fuels. Especially sulphur content increases when progressing from younger vegetation-based fuels to older ones. The amount of free alkali in a fuel can be represented by a free alkali index:

$$A_f = \frac{(Na + K - (2 \cdot S + Cl))}{LHV}$$

$A_f$=free alkali index, mol/MJ
Na=sodium content of fuel, mol/g
K=potassium content of fuel, mol/g
S=sulphur content of fuel, mol/g
Cl=chlorine content of fuel, mol/g
LHV=lower heating value of fuel, MJ/g Table 1 discloses alkali indexes calculated for average contents in various fuels.[1]

[1]Kurkela, E.,Formation and removal of biomass-derived contaminants in luized-bed gasification process, VTT publications 287, Espoo 1996.

TABLE 1

|  | K, Ppm | Na, ppm | Cl, ppm | S, % | LHV, MJ/kg | K, mol/kg | Na, mol/kg | Cl, mol/kg | S, mol/kg | $A_f$, mol/kg |
| --- | --- | --- | --- | --- | --- | --- | --- | --- | --- | --- |
| Straw (wheat) | 10910 | 230 | 2890 | 0.08 | 17.2 | 0.279 | 0.010 | 0.082 | 0.025 | 0.0092 |
| Whole tree chips | 2110 | 110 | 240 | 0.04 | 19.7 | 0.054 | 0.005 | 0.007 | 0.012 | 0.0014 |
| Eucalyptus | 890 | 670 | 940 | 0.02 | 18.5 | 0.023 | 0.029 | 0.027 | 0.006 | 0.0007 |
| Cortex (pine) | 1120 | 50 | 110 | 0.03 | 20.1 | 0.029 | 0.002 | 0.003 | 0.009 | 0.0004 |
| Sawdust (pine) | 500 | 40 | 15 | 0.01 | 19.0 | 0.013 | 0.002 | 0.000 | 0.003 | 0.0004 |
| Chips (pine) | 1060 | 30 | 75 | 0.03 | 18.9 | 0.027 | 0.001 | 0.002 | 0.009 | 0.0004 |
| Peat, surface | 690 | 380 | 180 | 0.10 | 18.5 | 0.018 | 0.017 | 0.005 | 0.031 | −0.0018 |
| Peat, Carex | 440 | 330 | 270 | 0.20 | 21.0 | 0.011 | 0.014 | 0.008 | 0.062 | −0.0051 |

TABLE 1-continued

|  | K, Ppm | Na, ppm | Cl, ppm | S, % | LHV, MJ/kg | K, mol/kg | Na, mol/kg | Cl, mol/kg | S, mol/kg | $A_f$, mol/kg |
|---|---|---|---|---|---|---|---|---|---|---|
| Rhine lignite | 140 | 300 | 250 | 0.30 | 24.1 | 0.004 | 0.013 | 0.007 | 0.094 | −0.0074 |
| Iowan Rawhide Coal | 570 | 1140 | 25 | 0.50 | 26.0 | 0.015 | 0.050 | 0.001 | 0.156 | −0.0096 |
| Polish Bituminous coal | 1420 | 450 | 760 | 0.70 | 29.2 | 0.036 | 0.020 | 0.021 | 0.218 | −0.0138 |
| Colombian Bituminous coal | 2600 | 440 | 130 | 1.00 | 28.4 | 0.066 | 0.019 | 0.004 | 0.312 | −0.0191 |
| Illinois No. 6. Bituminous coal | 3610 | 1420 | 1210 | 2.90 | 25.2 | 0.092 | 0.062 | 0.034 | 0.905 | −0.0670 |

Based on my own studies, I have come to the conclusion that alkali metal hydroxides are formed by free alkali in the process of burning biomasses. The free alkali indexes of biomasses are so high that sulphur and chlorine of the fuel are not capable of bonding all alkali into sulphates and chlorides. The surplus alkali forms hydroxides, which condensate and thus develop a tacky and corrosive molten phase on superheater surfaces. In particular, KOH present in a gas phase seems to be a significant factor in terms of promoting increased contamination and corrosion rate on superheater surfaces. Upon condensating on cold heat transfer surfaces, it may form a melt at much lower temperatures than KCl or $K_2SO_4$. Generally, biomasses contain a multiple amount of potassium as compared to sodium and, therefore, KOH is usually a more significant instigator of contamination and corrosion.

Indeed, based on my own conclusions, the positive effect of mixed burning is primarily based on the fact that, by increasing the $SO_2$-contents of flue gases, the KOH present in flue gases bonds into sulphates and thereby reduces fouling and corrosion in a superheater region.

Chemical equilibrium calculations indicate that alkali hydroxides begin to react with carbon dioxide present in a flue gas to produce alkali metal carbonates if the flue gases' temperature is less than 900° C. According to equilibrium calculations, when temperature is 750° C., nearly all of the hydroxide has reacted into carbonates. The melting points of alkali metal carbonates are 851° C. ($Na_2CO_3$) and 891° C. ($K_2CO_3$), so the temperatures of superheater surfaces can be considerably higher after the temperature of flue gases has fallen below 750° C.

According to my knowledge, the kinetics of a reaction between KOH and $CO_2$ has not been clarified. It is possible that the reaction rate is so slow that even in practice the reaction does not reach a state of equilibrium until a considerable time after the flue gases' temperature has reached the temperature of 750° C. In order to ensure a necessary residence time, the superheaters can be fitted in a flue gas duct in such a way that downstream of a preparatory temperature range of 750° C. for flue gases the duct is provided with a sufficiently long vacant section upstream of the next superheater.

One preferred embodiment of the invention is illustrated in FIG. 1. It shows schematically a steam generator, comprising a combustion chamber 1, superheaters 2–5 in a flue gas duct 6, as well as a steam circuit 7. The flue gases resulting from biomass presently burned in the combustion chamber 1 travel through the gas duct 6, while concurrently cooling, past the superheaters 2, 3, 4 and 5 present in the duct. Positioning in the flue gas duct 6 and serial arrangement in the steam circuit 7 regarding the superheaters 2–5 of a steam generator using biomass as a fuel and shown in FIG. 1 are implemented in such a way that the superheater 2 located within the zone of flue gases at more than 750° C. has its heat transfer surface at a temperature which remains below the melting point of KOH, 406° C. (corresponds to steam temperature of about 350–380° C.). After passing by the superheater 2, the flue gases' temperature has dropped below 750° C. The superheater 3 located within the zone of flue gases at less than 750° C. is used for the final superheating of steam to a higher temperature without significantly increasing the contamination and corrosion hazard for superheater surfaces. In order to ensure a necessary residence time, the superheater 3 is fitted in the flue gas duct 6 in such a way that downstream of a preparatory temperature range of 750° C. for flue gases the duct 6 is provided with a sufficiently long vacant section (a) upstream of the superheater 3. Downstream in the flue gases' flowing direction the flue gas duct is fitted with the superheaters 3 and 4. Thus, the passage of steam is such that it enters a steam circuit present in the steam generator by way of the coolest superheater 5 and progresses to the superheater 4, from which the steam passes to the superheater 2, which is the first in flue gases' flowing direction, and finally the steam discharges by way of the hottest superheater 3. Desired surface temperatures for the superheaters 2 and 3 and desired cooling for the flue gas are achieved by appropriately designing the relative flow rates of flue gas and steam and the heat exchange surfaces.

What is claimed is:

1. A method for positioning superheaters (2, 3, 4, 5) in biomass burning steam generators for minimizing the corrosion of superheater surfaces at a high temperature, wherein the steam generator is fitted with at least two superheaters (2, 3, 4, 5), whose positioning in a flue gas duct (6) and serial arrangement in a steam circuit (7) are effected in such a way that the superheater's or superheaters' heat transfer surface has its surface temperature remaining below the melting point of KOH, 406° C. (corresponds to a steam temperature of about 350–380° C.) down to the point in the flue gas duct (6), at which the flue gases' temperature has fallen to 750° C., and that, while the flue gases are within the range of less than 750° C., the final superheating is effected to a higher temperature without significantly increasing the contamination and corrosion hazard for superheater surfaces.

2. A method as set forth in claim 1, wherein, in order to ensure a necessary residence time, the superheaters are fitted in the flue gas duct (6) in such a way that downstream of a preparatory temperature range of 750° C. for flue gases the duct (6) is provided with a sufficiently long vacant section (a) upstream of the next superheater (3).

3. A steam generator using biomass as a fuel, comprising a combustion chamber (1), a flue gas duct (6), a steam circuit (7), and superheaters (2, 3, 4, 5) positioned for minimizing corrosion at a high temperature, wherein the steam generator is provided with at least two superheaters (2, 3, 4, 5), whose positioning in a flue gas duct (6) and serial arrangement in a steam circuit (7) have been effected in such a way that the superheater's or superheaters' heat transfer surface has its surface temperature remaining below the melting point of KOH, 406° C. (corresponds to a steam temperature of about 350–380° C.) down to the point in the flue gas duct (6), at which the flue gases' temperature has fallen to 750° C., and that, while the flue gases are within the range of less than 750° C., the final superheating has been effected to a higher temperature without significantly increasing the contamination and corrosion hazard for superheater surfaces.

4. A steam generator as set forth in claim 3, wherein, in order to ensure a necessary residence time, the superheaters have been fitted in the flue gas duct (6) in such a way that downstream of a preparatory temperature range of 750° C. for flue gases the duct (6) has been provided with a sufficiently long vacant section (a) upstream of the next superheater (3).

* * * * *